United States Patent [19]
Melton

[11] 3,792,782
[45] Feb. 19, 1974

[54] GRAPPLE ASSEMBLY
[75] Inventor: Donald F. Melton, Minneapolis, Minn.
[73] Assignee: Programmed & Remote Systems Corporation, St. Paul, Minn.
[22] Filed: Dec. 10, 1971
[21] Appl. No.: 206,760

Related U.S. Application Data
[63] Continuation of Ser. No. 866,197, Oct. 14, 1969, abandoned.

[52] U.S. Cl.......... 214/1 BD, 214/147 R, 294/103 R
[51] Int. Cl. .............................................. B66c 1/66
[58] Field of Search. 294/27 R, 103 R, 34, 103 CG, 294/82 R; 214/1 BD, 147 R, 147 T, 1 CM

[56] References Cited
UNITED STATES PATENTS
| | | | |
|---|---|---|---|
| 987,238 | 3/1911 | Kersten | 294/34 |
| 2,968,479 | 1/1961 | Lenz | 214/1 BD X |
| 2,888,153 | 5/1959 | Bozenka | 294/103 X |
| 3,255,893 | 6/1966 | Hainer | 214/1 CM |

Primary Examiner—Robert J. Spar
Assistant Examiner—George F. Abraham
Attorney, Agent, or Firm—Dugger, Johnson & Westman

[57] ABSTRACT

A grapple assembly for boom type material handling members permits limited swiveling movement for the grapple member when the member is being attached or disconnected from a heavy item to be moved and which when actuated becomes a rigid unit to permit positioning with its actuating boom.

14 Claims, 5 Drawing Figures

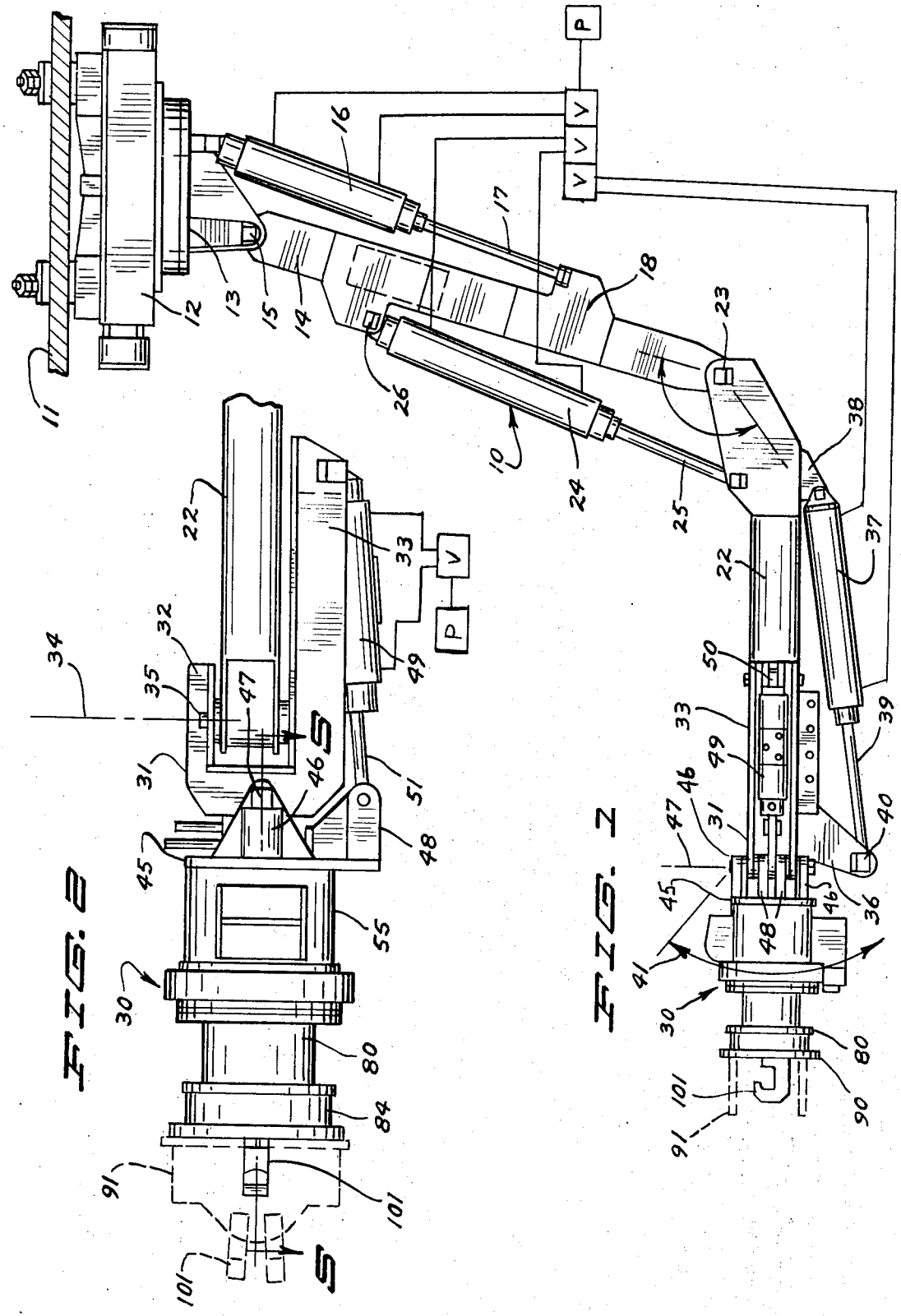

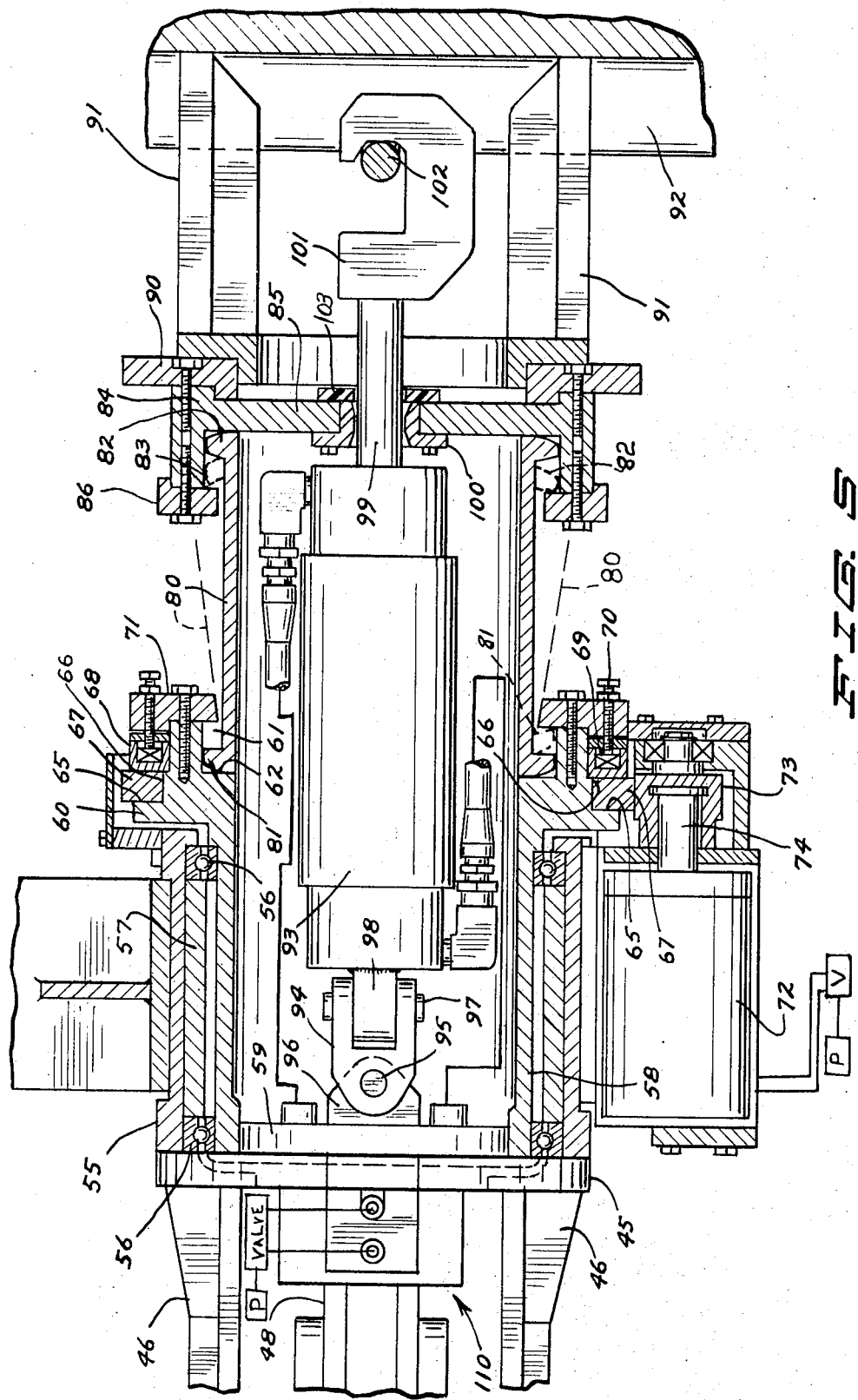

GRAPPLE ASSEMBLY

CROSS REFERENCE TO RELATED APPLICATION

This application is a continuation of my copending application, Ser. No. 866,197, Filed Oct. 14, 1969 now abandoned, for GRAPPLE ASSEMBLY.

BACKGROUND OF THE INVENTION

1. Field of the Invention

The present invention relates to grapple assemblies for use with material handling systems.

2. Prior Art

Various gripping members and grapple members have been used with articulated booms and other types of handling equipment. One of the problems in grasping and supporting extremely heavy objects is that large booms are hard to precisely manipulate so that the grapple can be precisely positioned and locked onto the object. Of course, chains and the like can be used for supporting loads, but these permit free swinging of the load and are not safe in many operations. It has been found that a certain amount of flexibility at the grapple or gripper end of the unit is desirable for fine positioning of the grapple and load, and that the use of a rigid grapple connection to the boom is desirable for handling and also rigid grapples can work in overhead position.

SUMMARY OF THE INVENTION

The present invention relates to a grapple or gripper used in connection with a powered handling device which can be easily maneuvered for precise alignment with the member to be handled or moved, and when the member is to be raised can be made into a rigid coupling to the member being raised or handled. The device herein has a hydraulic actuated grapple which when loosened can be made to swivel at its outer end a limited number of degrees in any direction, and when the load is supported it becomes a rigid unit. The grapple can be continuously rotated for positioning, and moved about a universal coupling joining the grapple to the main beam. This permits freely positioning the outer ends of the grapple to align with a load to be lifted.

BRIEF DESCRIPTION OF THE DRAWINGS

FIG. 1 is a side elevational view of a handling boom using a grapple made according to the present invention;

FIG. 2 is a top plan view of the grapple assembly portion of the device of FIG. 1;

FIG. 5 is a sectional view taken as on line 5—5 in FIG. 2.

DESCRIPTION OF THE PREFERRED EMBODIMENT

Figure 3:
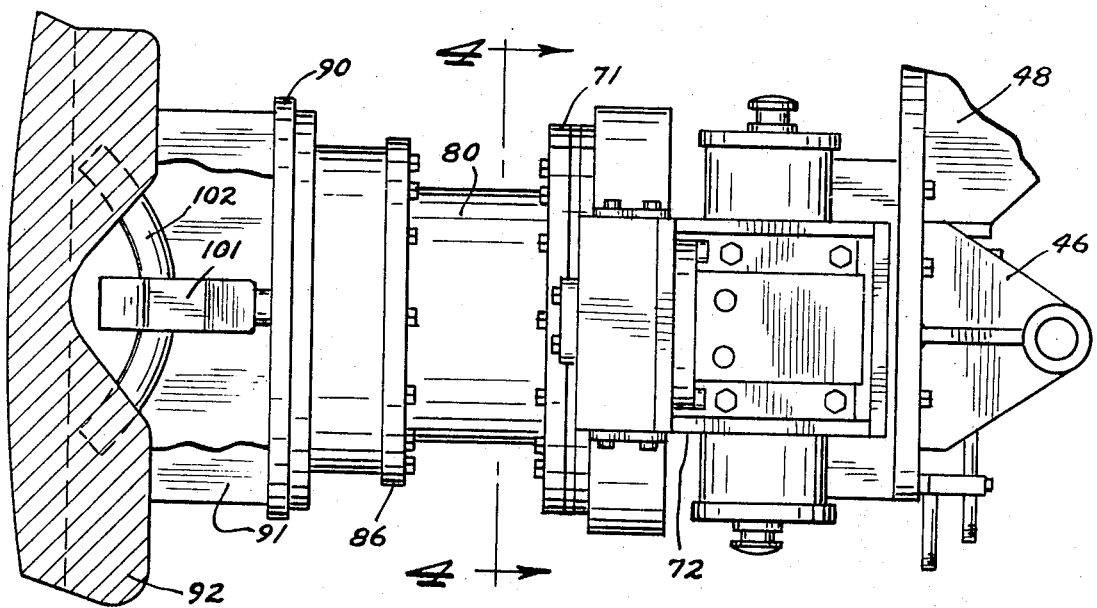
FIG. 3 is a bottom plan view of the grapple assembly.

Referring to FIG. 1, a typical load supporting member or unit with which the grapple assembly is used is illustrated. The unit comprises a mill liner handler boom illustrated generally at 10 which is an articulated boom that is adapted particularly for use inside of large mills such as are used in the making of taconite pellets. The mills are made with internal sectioned liners fastened into place, and the unit, particularly the grapple assembly, is used for removing worn liner sections and replacing them with new liner sections. The mill liner handler is fastened onto a suitable support 11, which is positioned so that the boom portions can be inserted into the mill for removing the liner sections. A power rotatable mounting assembly 12 is provided for the boom assembly. The mounting assembly is a unit that permits rotating the boom about a central axis substantially in a complete circle. The rotating assembly can use a motor drive in the manner known so that the main support brackets 13 will rotate with respect to support 11. The boom assembly 10 has a first inner or base boom section 14 pivotally mounted as at 15 to the support brackets. The boom section is movable about pivot 15 with a double action hydraulic cylinder-piston assembly 16 having an extendable and retractable rod 17 connected to a bracket 18 on the inner boom section. Upon extension or retraction of the hydraulic cylinder rod through the use of a conventional valve the boom section 14 can be moved about its pivot.

An outer boom section assembly 22 is pivotally mounted about an axis 23 to the outer end of the inner boom section assembly. The outer boom section assembly is controlled for movement about this axis through the use of a double action hydraulic cylinder-piston assembly 24 having a rod 25 that is extendable and retractable. The cylinder 24 is attached at its base end to a bracket 26 fixed to the inner boom section 14, and upon extension and retraction of the rod 25, the outer boom section 22 can be made to move about its pivot 23 with respect to the inner boom section. The outer boom section, as shown, has a grapple assembly 30 mounted at the outer end thereof. The grapple assembly 30 is made so that it will pivot with respect to the outer boom section about two mutually perpendicular axes thus making a universal coupling. As shown, the grapple assembly 30 has a first mounting bracket 31 which is U-shaped, and has unequal length legs. The mounting bracket has a first relatively short leg 32 and second parallel long leg 33. The legs 32 and 33 are positioned on opposite sides of the outer boom section 22. The grapple assembly is mounted to the outer boom about an axis 34 with a pin 35 extending through the legs 32 and 33 of the bracket and through the outer end of the outer boom section 22. The mounting bracket 31 has a laterally or outwardly extending arm 36 fixedly attached thereto. The arm 36 controls movement of the bracket 31 on the entire grapple assembly about the axis 34 through the use of a double acting hydraulic cylinder-piston assembly 37 which is attached at its base end to a bracket 38 fixed to the base end of the outer boom section 22. The cylinder 37 has a rod 39 which is extendable and retractable under pressure through conventional controls. The outer end of the rod 39 is attached as at 40 to the arm 36. By extension and retraction of the rod 39 through the use of the internal piston in cylinder assembly 37 the movement of the entire grapple assembly about the axis 34 in direction as indicated by the arrow 41 is controlled.

The grapple assembly 30 further is movable about an axis at right angles to axis 34. A grapple base 45 is provided with a pair of spaced apart ears 46 which in turn are pivotally mounted on opposite sides of the bracket 31 about an axis 47 which is at right angles to the axis 34. The grapple base 45 in turn has a bracket 48 fixed to one side thereof, so that it is offset from the ears 46 and from the tube 22. The long leg 33 of the bracket 31 is used to mount the base end of a double acting hydraulic cylinder-piston assembly 49 as at 50, and the cylinder 49, which has an extendable and retractable rod 51, is attached as at 52 to bracket 48. Upon extension and retraction of the cylinder rod 51 through the use of a hydraulic control valve, (the cylinder has an internal piston attached to the rod) the outer end of the grapple assembly can be moved about the axis 47. The cylinder 49 moves with the leg 33 of bracket 31 about axis 34.

One of the problems in picking up and handling the large heavy mill liner sections is that they are very rigidly connected to the side walls of the mill. The boom assembly also is quite rigid. It is difficult to control the hydraulic cylinders for the boom sections to get inching or limited movement of the boom. If a rigid hook or support for the mill liners is used it is difficult to get perfect alignment. It has been found that a rigid holding force for the mill liners is desirable because it permits positive handling of the mill liner sections and they do not then move all over. Thus, it is desirable to have an attachment device with flexibility for ease of attachment of the mill liner sections and also for ease of alignment of the sections when they are to be bolted into place, and yet rigidity for handling. The liner sections are heavy. The grapple assembly of the present invention has been designed to be flexible yet held as a rigid unit when loaded. As will be more fully understood as the description proceeds, the outer hook assembly can be manually moved back and forth for alignment purposes, and when the hook is tightened the grapple becomes rigid and securely holds the mill liner sections relative to the boom assembly. The action as the unit becomes rigid will cause the boom assemblies themselves to move slightly to take up the misalignment.

Figure 4:
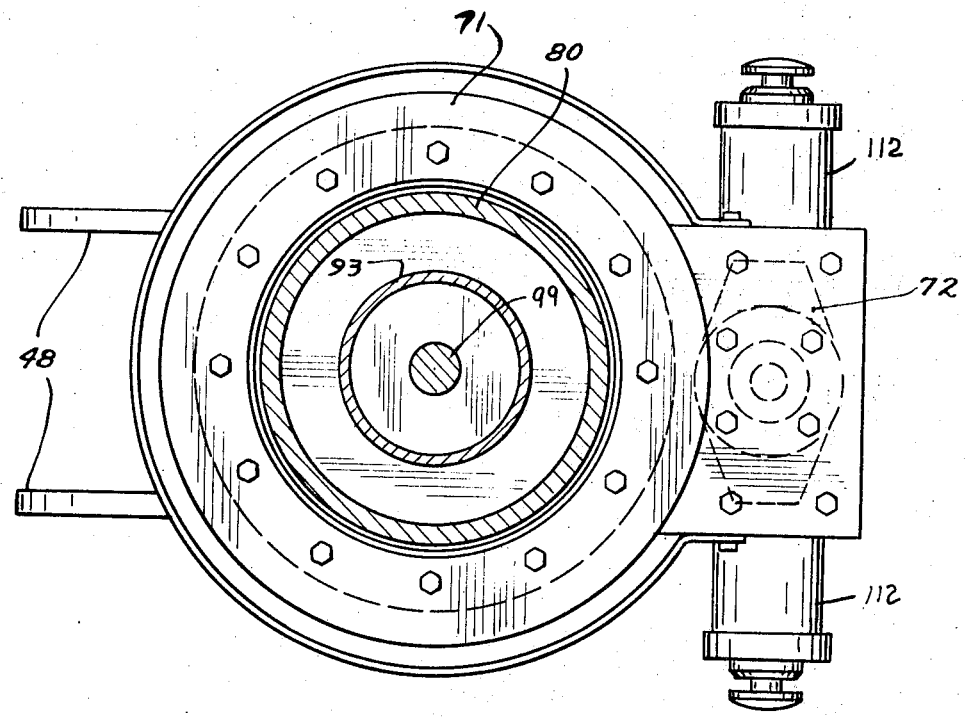
FIG. 4 is a sectional view taken as on line 4—4 in FIG. 3.

Referring now specifically to FIGS. 3, 4 and 5, the details of the grapple assembly are shown. The grapple base 45 includes a tubular housing 55 which is fixed to the base 45 with suitable fastening members. The housing 55 mounts a pair of spaced apart bearings 56,56 that are held in spaced relationship with a retainer ring 57. The bearings also mount on the outside periphery of a rotor 58 for the grapple. The rotor, as shown, is also a tubular member but is closed at one end with a plate 59. The plate 59 extends partially into a recess defined in the base 45 and is fastened in place to the tubular portion of the rotor. The bearings are slid onto the outer periphery of the rotor and are locked in place by a forward flange and a shoulder formed by the plate 59. The rotor is thus held axially in place with respect to the outer housing 55. The outer end of the rotor 58 has an annular flange 60 thereon and the outer end of the rotor has an internal recess 61 defined therein which is also annular and forms an outwardly facing shoulder 62. The recess 61 has an inner annular surface which is of greater diameter than the inside diameter of the rotor itself.

The flange 60 also has an external shoulder 65 formed at right angles to a turned down outer annular surface 66. A ring gear 67 is slidably mounted over the surface 66 and against the shoulder 65 so that one side surface of the ring gear 67 bears against the shoulder 65. A friction drive is formed between the shoulder 65 of the rotor and the ring gear by utilizing a clutch plate 68, which is an annular plate, bearing against the side surface of ring gear 67 opposite from the shoulder 65.

The clutch plate, as shown, is urged against the ring gear 67 through the use of Belleville type spring washers 69 adjusted with adjusting screws 70 to exert the desired amount of friction force against the ring gear. The adjusting screws are in turn threadably mounted through a retainer ring 71 that is bolted in place against the outer end surface of the rotor. The retainer ring 71 extends radially inwardly from the surface defining the recess 61 to form a retainer chamber. An annular guard is placed around the periphery of the ring gear. A hydraulic motor 72 is mounted onto the housing 55, and a gear 73 is drivably mounted onto the output shaft 74 of the motor. The output shaft of the motor 72 is mounted to be supported in an outboard bearing and support member, as shown in FIG. 5. The gear 73 drivably engages the ring gear 67 so that when the motor 72 is driven by controlling the associated control valve, the gear 73 will rotate the ring gear 67, and this in turn will rotate the rotor through the friction drive of clutch plate 68. The rotor can be continuously rotated about its center axis in bearings 56 when the motor 72 is being driven.

The grapple also includes an outwardly extending swivel sleeve or collar 80, which is a tubular compression carrying sleeve and has a pair of annular flanges or rims 81 and 82, one at each end thereof. The flange or rim 81 is made to fit into the receptacle 61 against the shoulder 62. When the collar is released, the flange 81 is free to move so that it will go up to contact the inner edge of retainer plate 71 when the swivel is loose. Note that the inner annular edge surface of the retainer plate 71 is angled at a slight angle with respect to the axis of the unit. The flange or rim 82 is positioned within an annular receptacle 83 defined in an outboard support member 84. The support member 83 is an annular housing having a closed end plate 85. The flange 82 fits within this housing and is retained in the housing with a retainer ring 86.

The flange 82 at the outer end of the swivel collar is free to move between the end plate 85 and the retainer ring 86 so that the outer housing 84 can move with respect to the swivel collar if the unit is not being held in its solid position. The outer housing 84 also mounts an outer end clamp assembly 90 which is bolted into the end of the outer housing, and includes a backing plate mounting a pair of support members 91,91 which are spaced apart. The outer edges of the support members are formed into a configuration which mates with the surface of a mill liner section 92 so that the mill liner section (the load to be handled) can be clamped against the support members 91.

In order to make the grapple assembly operate, a hydraulic cylinder assembly 93 is mounted on the interior of the rotor with a universal coupling 94. The coupling 94 is mounted with a first pin 95 to brackets 96 fastened on the plate 59, and with a second pin 97 to a member 98 on the cylinder asssembly itself. Thus, the cylinder can pivot about two separate axis, the axis of pins 95 and 97 which are mutually perpendicular. The cylinder is a double acting cylinder-piston assembly having a rod 99 extending outwardly therefrom. The rod 99 is slidably mounted in a chamfered bushing 100 that in turn is mounted onto the end wall 85 of the outboard support. The cylinder is guided by this bushing. A rubber compression washer 103 is fastened to the outer surface of plate 85 and the hook 101 will abut against it when the cylinder is retracted and is not supporting a load. At the outer end of the rod 99 there is a hook member 101 fixedly attached. The hook member 101 can be removed to permit the rod to be slid through the bushing during assembly. The hook is threaded onto the end of the rod and then held in place with a set screw in actual assembly.

The hook member 101 is made so that it will engage a clevis, pin, eyelet or other attaching member 102 fixed to the mill liner section 92, and the hook can be looped around this member 102. Then, when the rod of hydraulic cylinder 93 is retracted, under hydraulic pressure, the hook 101 will pull the mill liner section and the grapple assembly together so that the support members 91,91 engage the surface of the mill liner section. This will put compression against the clamping member 90 and against the outboard support 84 as well. This will push the wall 85 against the end surface of the swivel collar 80 causing the opposite end or inner end of the swivel collar to bear against the surface 62 on the rotor. The compression force from the hydraulic cylinder 93 will then be transferred back through the rotor and plate 59. This force of the cylinder 93 will hold the swivel collar and rotor as a rigid unit. The bolts holding the mill liner section being handled can be loosened as the grapple is tightened so they will align. Then, after the grapple is held rigid, the mill liner section attaching bolts will be removed and the mounting boom assembly can be operated to remove the mill liner section from the mill.

When the cylinder 93 is again loosened with respect to the mill liner section so that the hook is not tightly pulling the mill liner section against the clamping member, the forward or outboard support member 84 will be free to swivel slightly with respect to the flange 82 on the swivel collar. The flange can be moved back and forth in the receptacle between retainer plate 86 and end wall 85, and the flange 81 of the swivel collar can be moved in receptacle 61 between the retainer plate 71 and surface 62. AS shown in dotted lines, this will permit the swivel collar 80 to extend at an angle with respect to the axis of rotation of the rotor in any direction about the rotor axis. When the grapple member is to be attached to a fixed unit such as the mill liner section, it can thus be manually maneuvered a limited amount to eliminate the necessity for exact, precise alignment of the grapple member through the use of the booms and cylinders for controlling the booms. This eliminates a lot of time that has been necessary in the precise positioning of the booms, and the grapple can be easily connected to rigid load members. When the cylinder 93 is tightened up again, the boom will give enough so that the swivel collar will be held solidly against the rotor under compression. It should also be noted that the continuous rotatability of the grapple member is still present, but the outer end hook can be swiveled manually to permit ease of fastening.

Hydraulic fluid under pressure is carried to the cylinder 93 through a hydraulic slip ring assembly 110. The hydraulic slip rings permit carrying hydraulic pressure from a stationary outer member, to which hoses are attached (this is connected to base 45) to a rotatable inner member connected to plate 59. The fluid under pressure then passes through hoses from the plate to the cylinder assembly 93. The moveable part of the assembly on the rotor has passageways and connection nipples for connecting hoses from the cylinder 93 to the respective fluid connections and its associated control valve. The power means (cylinder 93) can use other tension carrying members for transferring the force to the load to be lifted. For example, the power means can act through cables, chains or their links.

The rubber washer 103 acts as a resilient compression member against which hook 101 can be abutted when there is no load on the grapple. The force against the washer 103 resiliently holds the collar 80 and the end plates in position when the hook 101 is pulled back against it.

The entire boom can be positioned completely inside the mill, if desired, for operation and then removed when the job is complete.

The hydraulic pumps and valves as well as the pressure hoses leading to the various cylinders are shown schematically. The hydraulic slip ring assembly is a standard type unit known in the art. The hydraulic motor may be an orbit type hydraulic motor manufactured by Char-Lynn Company of Eden Prairie, Minnesota.

The control valves are solenoid operated and the controls may be on a hand held unit so the operator can stand adjacent to the grapple while actuating the cylinder 93. The operator can thus manually move the hook 101 and outer end of the grapple to engage the load and actually lighten up the load and grapple as he closely observes the action.

Emergency stop switches 112 can be provided on the grapple which can be used to shut off power to the unit in an emergency.

What is claimed is:

1. A load carrying member comprising a support, power means mounted on said support, said power means comprising a fluid pressure actuated cylinder, said cylinder including an actuable rod extendable and retractable with respect to said support, said rod including means to be attached to a detached load and when each rod is retracted said cylinder forcing said load and said support toward each other in a first direction, a compression carrying load stabilizing member, means to mount said compression carrying load stabilizing member relative to said support to permit movement of an outer end of said compression carrying member in direction transverse to the first direction, said means to be attached to a load extending outwardly beyond said compression carrying member, and means to actuate said cylinder to retract said rod to force a load attached to said rod toward said support until said load engages the outer end of said compression carrying member, said compression carrying member having first portions thereof adapted to be engaged by a load moved inwardly by said cylinder, said first portions contacting said load in spaced locations with respect to the means to attach to the load to stabilize said load, and said compression carrying member having second portions at a second end thereof which are pressed against and supported on said support under compressive forces from said cylinder, said compressive forces acting through an attached load to urge the compression carrying member against said support.

2. The combination as specified in claim 1 wherein said compression carrying member comprises a sleeve surrounding said fluid pressure actuated cylinder.

3. The combination specified in claim 2 wherein said means to mount said compression carrying member relative to said support comprises cooperating groove and rim means, said groove being of size to permit movement of said rim therein when said sleeve is not supported in compression.

4. The combination specified in claim 3 wherein said first portions of said compression carrying member comprises a load engaging member mounted at the outer end of said sleeve, and means on said load engaging member for mounting said load engaging member on said sleeve and permitting angular movement with respect thereto.

5. The combination as specified in claim 3 wherein said means to mount said compression carrying member relative to the support includes rotor means rotatably mounted with respect to said support, power means to rotate said rotor means, said cooperating groove and rim means being on said rotor means and sleeve respectively.

6. A load carrying member comprising a support, power means mounted on said support, said power means comprising a hydraulic cylinder including a rod extendable and retractable with respect to said support and having means thereon to mechanically attach to a detached load and to force said load and said support toward each other in a first direction when the rod is retracted under pressure, a compression carrying sleeve assembly having an outer end, means to captively mount said compression carrying sleeve assembly relative to said support to permit movement of an outer end of said sleeve assembly in direction transverse to the first direction, a support mounted on the interior of said sleeve assembly to slidably receive and guide said rod, said means to attach to a load extending outwardly beyond said sleeve assembly, and means to actuate said cylinder to move said means to attach toward said support to force a load attached thereto toward said support until said load engages the outer end of said sleeve assembly, said sleeve assembly having outer end portions thereof adapted to be engaged by a load moved toward the support by said power means, said outer end portions contacting said load in spaced locations with respect to the means to attach to the load to stabilize said load, and said compression carrying member having second portions at a second end thereof which are pressed against and supported on said support under compressive forces from said power means, said compressive forces acting through an attached load to urge the compression carrying member against said support.

7. The combination as specified in claim 6 wherein said support includes an articulated boom comprising at least two boom members mounted for movement about a first axis relative to each other and about a second axis at right angles to said first axis, and power means to control movements of said boom.

8. A load carrying member comprising a support, a compression carrying link member having first and second end portions, means to captively attach said first end portion of said link member on said support to permit movement of said second end portion of said link member transverse to said support when said link member is not under compression load, power means comprising a force applying fluid pressure actuated cylinder attached to said support and having powered extendable and retractable means for physically engaging a load to be lifted, said extendable and retractable means extending outwardly beyond the second end portion of the link member and being extendable and retractable under power toward and away from said support, means at said second end portion of said link member having spaced surface portions on opposite sides of said extendable and retractable means, said spaced surface portions engaging surface portions of a load member to be lifted when said load member is engaged by said extendable and retractable means and is moved toward said link member by said power means, thereby to transfer compression force from said power means through said load member and through said link member to said support, said link member and said support being pressed together and engaging each other in spaced locations to thereby be stable under compression loading from said power means to prevent relative movement between said support and said link member when said load is supported through the link member by force from the power means.

9. The load carrying member of claim 8 wherein said link comprises a tubular sleeve, one end of said sleeve abutting on a mating surface of said support when under compression.

10. The load carrying device of claim 8 and resilient means on said link member positioned to be engaged by a movable portion of said cylinder when said cylinder is retracted and no load is being supported thereby.

11. In combination with an articulated boom assembly comprising a plurality of boom sections pivoted together and having power means for controlling said boom for pivoting movement to handle a load, a grapple member at an outer end of said boom, means to mount said grapple to said boom for movement about a universal connection, power means for controlling movement of said grapple about said connection, a base connected to said universal connection, a rotor rotatably mounted on said base, about a rotor axis power means to control rotation of said rotor, a compression carrying member, means to mount said compression carrying member for limited movement on said rotor so that the outer end thereof may move transversely to the axis of the rotor, and power means on said rotor extendable in axial direction of said rotor to engage a load to be supported and retractable to force said load toward said rotor, first against said compression carrying member, and subsequently to clamp said compression carrying member between the load and said rotor to form a rigid load unit under compressive force.

12. The device of claim 11 wherein said power means comprises a fluid pressure actuated cylinder.

13. The device of claim 12 wherein said compression carrying member comprises a sleeve, and a ring mounted on the outer end of said sleeve for limited movement with respect to said sleeve when there is no compressive force on said sleeve, said ring having means to engage said load to be supported.

14. A load carrying member comprising a support, power means mounted on said support, said power means including means movable inwardly and outwardly with respect to said support to mechanically attach to a detached load and to force said load and said support toward each other in a first direction, a compression carrying load stabilizing member having spaced wall portion at an outer end thereof, means to captively mount said compression carrying load stabilizing member relative to said support to permit movement of said outer end of said compression carrying member in direction transverse to the first direction, said means to attach to a load being positioned between said spaced wall portion and extending outwardly beyond said compression carrying member, guide means mounted between said wall portions to guide the position of said means to attach to a load in relation to said compression carrying member, and means to actuate said power means to move said means to attach to a load inwardly toward said support to force a load attached thereto toward said support until said load engages the outer end of said compression carrying member, said spaced wall portions at the outer end of said compression carrying member being engaged by a load moved inwardly by said power means, said spaced wall portions contacting said load in spaced locations with respect to the means to attach to the load to stabilize said load, and said compression carrying member having second portions at a second end thereof which are pressed against and supported on said support under compressive forces, said compressive forces being provided by said power means acting through an attached load to urge the compression carrying member against said support.

* * * * *